United States Patent [19]

Nierescher et al.

[11] Patent Number: 5,693,431
[45] Date of Patent: Dec. 2, 1997

[54] RECHARGEABLE BATTERY PACK FOR MOBILE TELEPHONES

[75] Inventors: David Nierescher, New Castle; Samuel E. Cassese, Issaquah, both of Wash.

[73] Assignee: SelfCHARGE, Inc., Bellevue, Wash.

[21] Appl. No.: 512,668

[22] Filed: Aug. 8, 1995

[51] Int. Cl.⁶ ................................................. H01M 2/10
[52] U.S. Cl. ..................... 429/97; 429/99; 429/121; 429/123; 429/7
[58] Field of Search ........................ 429/96, 97, 99, 429/123, 121, 7

[56] References Cited

U.S. PATENT DOCUMENTS

| | | | |
|---|---|---|---|
| 4,904,549 | 2/1990 | Goodwin et al. | 429/97 |
| 4,922,178 | 5/1990 | Matsuszewski | 320/2 |
| 5,449,567 | 9/1995 | Yeh | 429/7 |
| 5,459,389 | 10/1995 | Fujiwara et al. | 320/2 |

*Primary Examiner*—Kathryn L. Gorgos
*Assistant Examiner*—Kishor Mayekar
*Attorney, Agent, or Firm*—Christensen O'Connor Johnson & Kindness PLLC

[57] ABSTRACT

A battery pack (20) holds one or more batteries (118) and connects to a mobile telephone (115). The battery pack includes a case (22) for holding the batteries, a recharging circuit (122) disposed in the case, a plug (86) rotatably connected to the case and electrically connected to the recharging circuit, and electrical terminals 46 mounted to the case. The plug includes a pair of generally parallel, spaced prongs (88). The plug rotates from a first position, having the prongs projecting from the case, to a second position having the prongs retracted into the case. Electrical leads (47) extend from each of the electrical terminals to battery terminals. A pair of contacts (110) and (112) spaced from another, interrupts each of the electrical leads. When the prongs retract, each electrical contact of a contact pair electrically connects to one another through a prong. When the prongs extend, the electrical contacts are disconnected from one another.

10 Claims, 7 Drawing Sheets

RECHARGEABLE BATTERY PACK FOR MOBILE TELEPHONES

FIELD OF THE INVENTION

The present invention relates generally to rechargeable battery packs, and in particular, to rechargeable battery packs for mobile telephones.

BACKGROUND OF THE INVENTION

Many mobile telephones include a rechargeable battery pack connected to the telephone for supplying electrical power. Generally, these mobile telephones include a recharging socket or stand for recharging the battery pack when it becomes drained. The stand connects to another source of electrical power, such as a standard, household electrical outlet, and uses this power to recharge the battery pack. When not in use, the battery pack and its associated mobile telephone are frequently stored in the stand, which continuously supplies electrical power to the battery pack so long as the telephone and its associated battery pack remains in the stand. This maintains the battery pack in a fully charged condition for use when needed.

Usually, the recharging stand is not as portable as the telephone and its associated battery pack. Therefore, frequently the telephone and battery pack are taken on trips, without the recharging stand. However, often the battery pack becomes depleted while on these trips, making the telephone unusable until the battery pack is recharged.

One attempted solution to this problem is the provision of one more additional battery packs for the telephone. Thus, before leaving on a trip, all of the battery packs are charged, and taken along with the telephone. When a battery pack becomes depleted, another charged battery pack is used in its place. However, the problem with this solution is that it necessitates carrying additional battery packs, which is inconvenient and reduces the portability of the telephone.

The present invention provides an improved solution.

SUMMARY OF THE INVENTION

The present invention provides a battery pack for holding one or more batteries and for connecting to a mobile telephone. When connected to the mobile telephone, the battery pack supplies electrical power from the batteries for operation of the telephone.

The battery pack includes a case for holding the batteries, a recharging circuit disposed in the case for recharging the batteries, and a plug for electrically connecting the recharging circuit to an external source of electrical power. The plug rotates from a first position, having the prongs projecting from the case, to a second position having the prongs retracted into the case. When the prongs project from the case, the prongs may be inserted into a standard electrical outlet for recharging the battery pack from a relatively high voltage source (approximately 90 to 250 volts) of alternating current electrical power. The recharging circuit in the case electrically connects to each of the prongs, and to the batteries in the battery pack.

The battery pack may also be recharged from a relatively lower voltage source of direct current electrical power. For this purpose, a pair of electrical terminals mount to the case for connecting the case to an external source of direct current electrical power. Electrical leads extend from each of the electrical terminals to battery terminals for recharging the batteries in the case.

Further, a pair of contacts, spaced from another, interrupts each of the electrical leads. When the plug rotates to the first position having the prongs retracted, each electrical contact of a pair of contacts electrically connects to one another through a prong. That, is one of the prongs contacts each of the contacts of a spaced pair of contacts. However, when the plug rotates to the second position with the prongs extended, each prong is removed from at least one contact of a contact pair, thereby electrically disconnecting the contacts of a pair from one another. This arrangement minimizes electrical shock hazard through the electrical terminals when recharging the battery pack from a standard household electrical outlet.

The recharging circuit includes an electrical brush biased to press against each of the prongs. The brushes press against the base of each prong at a location removed from the longitudinal axes of the prongs, and generally in the direction the prongs rotate when the plug is rotated to project the prongs away from the case. The pressing force of the brushes thus creates a torque, which tends to retain the plug in the position having the prongs projecting from the case.

The battery pack further includes a first set of apertures formed in the bottom of the case. These apertures are spaced from one another at generally equal intervals, and aligned with another. The case similarly includes a second set of apertures formed in the top of the case above the first set of apertures. The apertures of the second set are also aligned with another, and spaced at approximately equal intervals corresponding to the spacing between the apertures of the first set. However, the apertures of the first and second sets are offset from one another.

A plurality of electrical terminals mount in the first and second apertures. Specifically, one end of each electrical terminal is positioned in an aperture of the first set, and the other end is positioned in an aperture of the second set. Columns extend from the top of the case to retain the end of each electrical contact in an aperture of the first set. Similarly, columns extend from the bottom of the case to retain the other end of each electrical terminal in an aperture of the second set. In particular, the distal ends of the columns press the ends of the electrical terminals into the apertures. The terminals are for electrically connecting the battery pack to a direct current source of electrical power, such as from a recharging stand, and for electrically connecting the battery pack to the mobile telephone.

The battery pack includes slide tabs for slidably engaging corresponding tabs or plates on the mobile telephone for mechanically connecting the battery pack to the telephone. When the battery pack slidably connects to the telephone, a battery pack latch mechanism removably locks the battery pack in place. More particularly, the latch mechanism includes a torsion beam having opposite first and second ends connected to the case. A first tab extends in a direction transversely away from the torsion beam, and includes a distal end extending away from the case towards the telephone. When the battery pack slidably engages the telephone, the distal end "snaps" over, or engages a first rib extending in the direction opposite from the telephone, locking the battery pack in place.

To disengage the distal end of the first tab from the first rib, a second tab extends away from the torsion beam in a direction generally opposite to the direction the first tab extends. Further, a second rib or ribs project from the torsion beam in a direction away from the battery pack, and towards the telephone. When the second tab is pressed away from the case, the torsion beam resiliently twists and rotates about the second rib of the torsion beam. This twisting causes the first tab to rotate away from the case for disengaging the distal end of the first tab from the first rib of the telephone.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE EMBODIMENT

Figure 1:
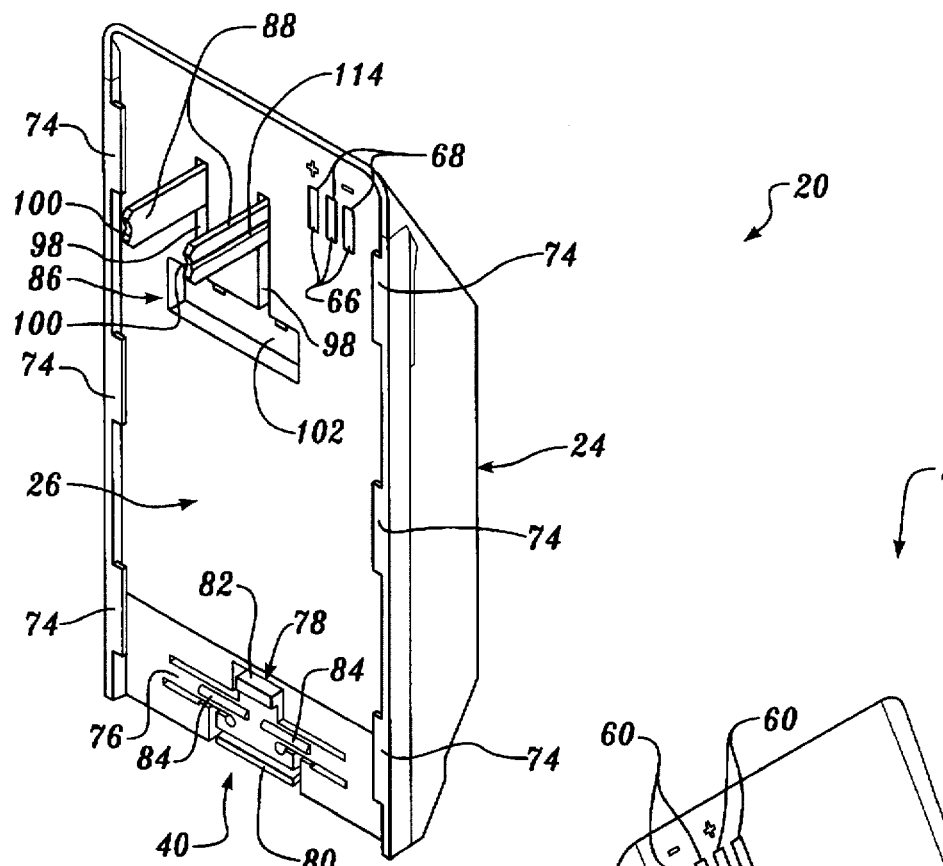
FIG. 1 illustrates a perspective view of the bottom of a preferred embodiment of a rechargeable battery pack for mobile telephones in accordance with the present invention.
Figure 15:
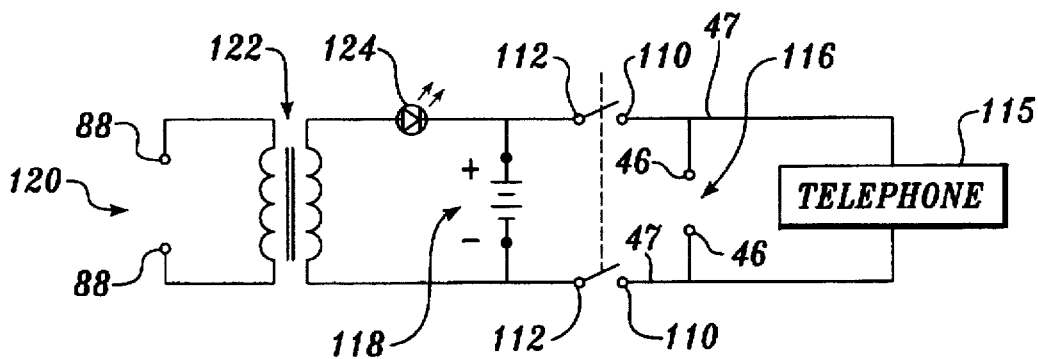
FIG. 15 illustrates an electrical schematic diagram for the battery pack of FIG. 1.

FIG. 1 illustrates a preferred embodiment of a battery pack 20 in accordance with the present invention. The battery pack 20 stores a battery or batteries, and removably connects to a mobile telephone for supplying electrical power to the telephone. (FIG. 15 schematically illustrates a mobile telephone 115 and batteries 118 in conjunction with an electrical diagram). The battery pack 20 includes three primary systems: 1) a storage system for holding the batteries; 2) a connection system for electrically and/or mechanically connecting the battery pack to external systems, such as a mobile telephone; and 3) a recharging system for recharging the batteries.

Figure 3:
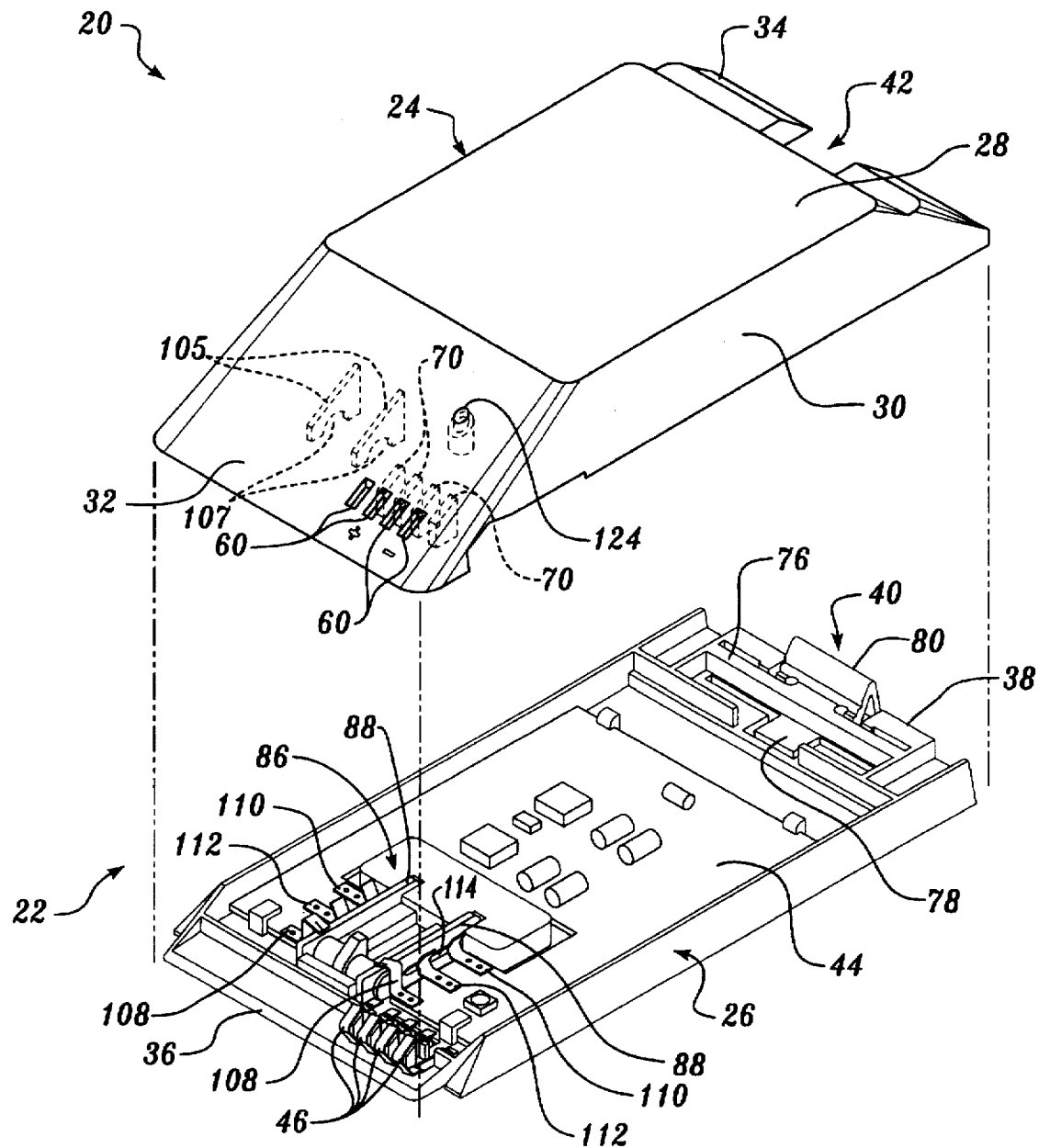
FIGS. 3 and 4 illustrate partially exploded perspective views of the battery pack of FIG. 1.

The battery pack 20 storage system includes a hollow case 22, having a top portion 24 mated to a base portion 26. FIG. 3 illustrates a view of the battery pack 20 with the top portion 24 removed from the base portion 26.

When viewed from the side, the top portion 24 of the case 22 forms a shape corresponding generally to a hollow trapezoid having an open base. The top portion 24 includes a generally rectangular top wall 28 having rounded corners. Forward and rear walls 32 and 34 slope obtusely downward from the ends of the top wall 28. A pair of substantially vertical side walls 30 connect the longer edges of the top wall 28 to the sloped edges of the forward and rear walls 32 and 34. The bottom of the top portion 24 remains opens.

The base portion 26 forms a shape corresponding generally to a hollow, rectangular, right parallelepiped of shallow height. The width and length of the base portion 26 correspond approximately to the width and length of the open bottom of the top portion 24. Thus, the base portion 26 mates to the bottom of the top portion 24, thereby covering the open bottom of the top portion.

The forward end 36 of the base portion 26 slopes obtusely downward to fit closely underneath the sloped forward wall 32 of the top portion 24. The rear end 38 of the base portion 26 includes an upwardly projecting latch mechanism 40, which is a part of the connection system for physically connecting the battery pack 20 to a mobile telephone. The rear sloped wall 34 of the top portion 24 includes a notch 42 that accommodates the upward projection of the latch mechanism 40.

The base portion 26 includes additional structural items for supporting other parts of the connection and recharging systems. These additional structural items will be described later in conjunction with the description of the connection and recharging system.

Preferably, the case 22 is formed from a polymeric material, such as thermoplastic. The top portion 24 may be mated to the base portion 26 by any method known in the art, such as snap fittings, adhesives, fasteners, plastic welding and etc. When the top portion 24 mates to the lower portion 24, the battery or batteries are centrally retained in the hollow interior of the top portion.

As noted previously, the connection system electrically and/or mechanically connects the battery pack 20 to external systems, such as a mobile telephone. For electrical connections, the connection system includes a circuit board 44, a plurality of electrical terminals 46, structure as described more fully below for properly supporting and retaining the circuit board and the electrical terminals in the battery pack 20, and a plurality of electrical leads 47, which are schematically illustrated in FIG. 15.

Figure 4:
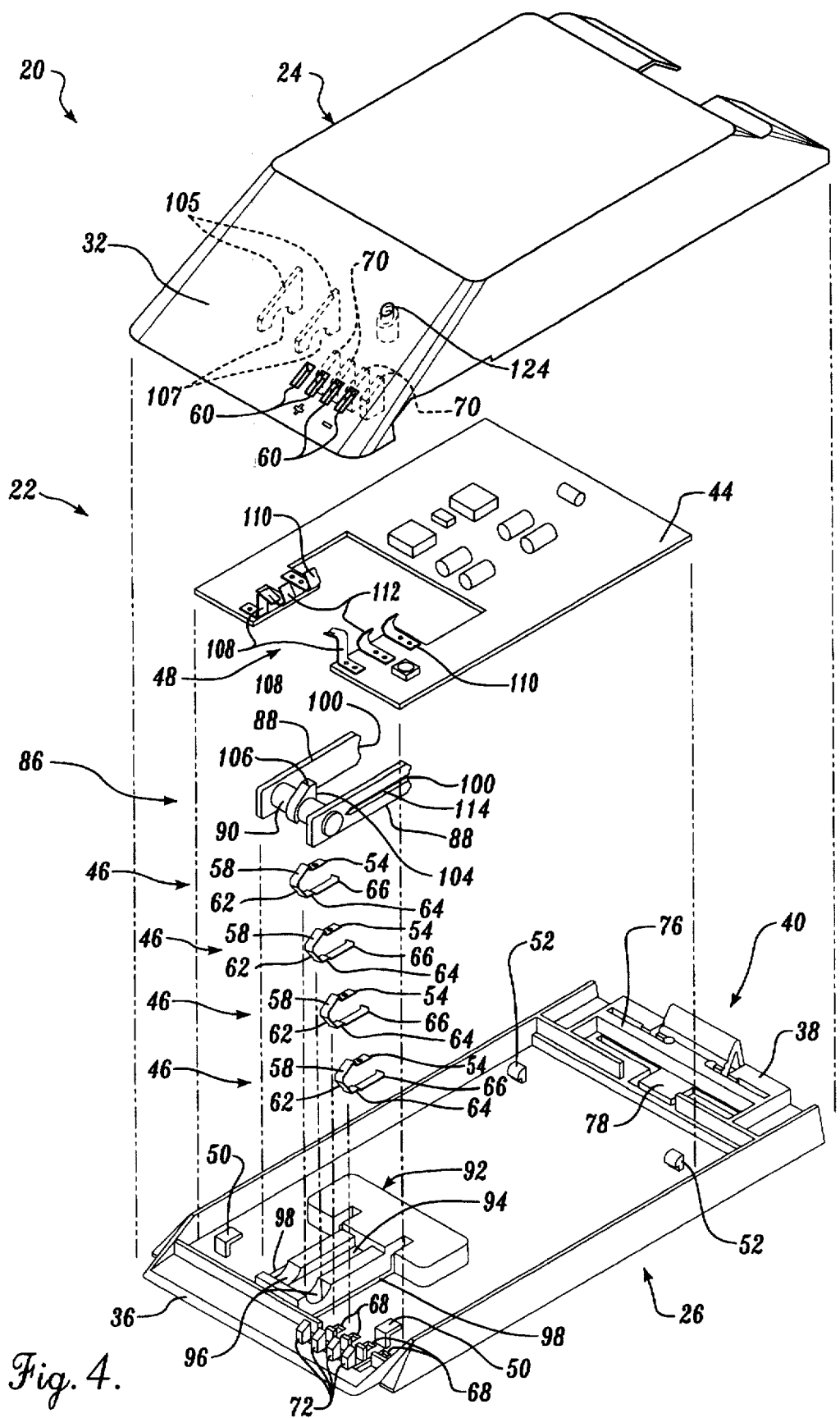

The base portion 26 supports and retains the circuit board 44 just below the top portion 24 when the two portions mate together. FIG. 4 illustrates a view of the battery pack 20 having the circuit board 44 exploded away from the base portion 26. Referring to FIG. 4, the circuit board 44 forms a shape corresponding generally to a rectangle, having a cut-out 48 formed centrally in one end of the rectangular shape. The cut-out 48 corresponds generally in shape to an upper-case letter "T". As will be explained in more detail later, the T-shaped cut-out 48 accommodates a portion of the recharging system. Preferably, a polymer material forms the circuit board 44, having electrical connections and circuitry defined thereon by any method known in the art, e.g., by silk-screening, soldering, and etc.

The base portion 26 supports the circuit board 44 in an orientation generally parallel to the bottom of the lower portion. Further, the base portion 26 supports the circuit board 44, with the end having the T-shaped cut-out 48 adjacent the forward end 36 of the base portion.

Two spaced-apart tabs 50, formed generally in the shape of an upper case letter "L" project upwardly from the bottom of the base portion 26. One leg of the L-shape of each tab 50 projects vertically from near the forward end of the base portion 26. The other leg of the tabs 50 projects rearwardly. A pair of tabs 52 at the other end of the base portion 26 mirror the tabs 50 at the forward end. However, the rearward tabs 52 have forwardly projecting legs, which round concavely towards the bottom of the base portion 26. Additionally, a spring (not shown) flexibly mounts each of the rearward tabs 52 to the base portion 26.

To fasten the circuit board 44 to the base portion 26, the end of the circuit board having the T-shaped cutout 48 is slid under the forward tabs 50. The opposite end of the circuit board 44 is then snapped into the rear tabs 52 by pressing the circuit board against the rounded legs of the rear tabs. Additionally, the springs connecting the rear tabs 52 to the base portion 26 flex to facilitate mounting the circuit board 44 into the tabs.

As noted previously, the connection system includes a plurality of electrical terminals 46 as shown in FIG. 3. The electrical terminals 46 mount to one side of the forward end 36 of the base portion 26. FIG. 4 illustrates the electrical terminals 46 exploded away from the base portion 26, and FIGS. 5 and 6 illustrate enlarged views of a single electrical terminal.

Figure 5:
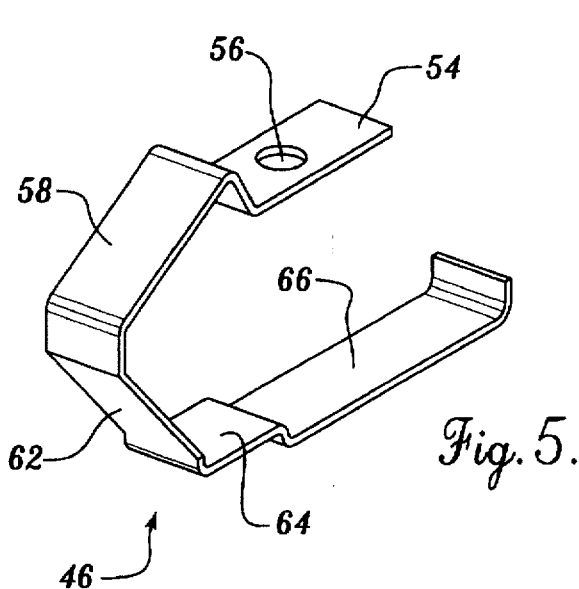
FIG. 5 illustrates an enlarged perspective of an electrical terminal shown in FIGS. 3 and 4.
Figure 6:
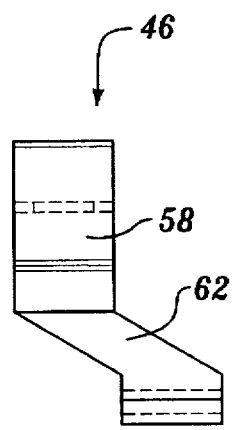
FIG. 6 illustrates an end view of the electrical terminal of FIG. 5.

Referring to FIG. 5, preferably the electrical terminals 46 each form a shape roughly corresponding to the shape of a letter "U" when the terminals are viewed from the side. More particularly, thin strips of a metal sheeting are bent to form a plurality of segments connected end-to-end, which roughly approximate the U-shape.

With reference to FIG. 3, the electrical terminals 46 mount to the forward end of the base portion 26, and to the forward wall of the top portion 24 of the case 22. Specifically, the electrical terminals 46 mount to the case proximate the location where the sloped forward wall 32 meets the forward end 36 of the base portion 26. The electrical terminals 46 are oriented so that the U-shape opens towards the rear end 38 of the base portion 26. One leg of the U-shape of each electrical terminal 46 extends downwardly and rearwardly along the length of the base portion 26, while the other leg extends upwardly and rearwardly.

Returning to FIG. 5, a generally straight section forms the distal end segment of the upper leg of the U-shape. The distal end segment 54 includes an aperture 56 formed therethrough to facilitate connecting an electrical lead 47 thereto (see FIG. 15) for connection to the circuit board 44.

An upper contact segment 58 connects to the distal end segment 54. In particular, the upper contact segment 58 bends convexly downward at one end to the distal end segment 54, and convexly downward at the opposite end to form a portion of the bottom of the U-shape.

As shown in FIGS. 5 and 6, a slanted segment 62 connects to the end of the upper contact segment 58 opposite the distal end segment 54. The slanted segment 62 forms the major portion of the closed end of the U-shape approximated by the electrical terminal 46. Looking towards the forward end 36 of the case 22 as in FIG. 4, the slanted segment 62 slopes diagonally downward to the right.

The lower end of the slanted segment 62 connects to a generally straight, rearwardly extending transition segment 64. A lower contact segment 66 connects to the rear end of the transition segment 64. The lower contact segment 66 is generally straight except for the ends. In particular, the forward end curves convexly upward to connect to the transition segment 62. The distal end of the lower contact segment 66 also curves convexly upward.

With reference to FIG. 4, the top portion 24 of the case 22 includes a plurality of substantially rectangular upper apertures 60. The upper apertures 60 are formed in the front wall 32 at generally regular, spaced intervals.

Figure 7:
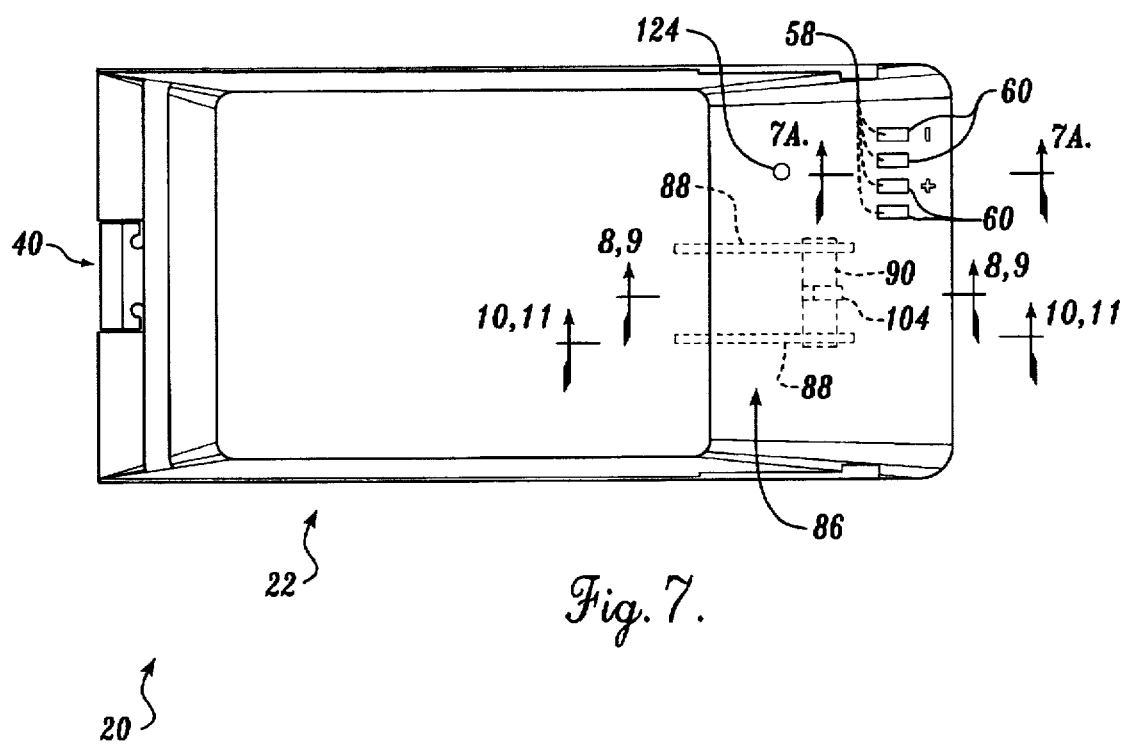
FIG. 7 illustrates a top view of the battery pack of FIG. 1.
Figure 7A:
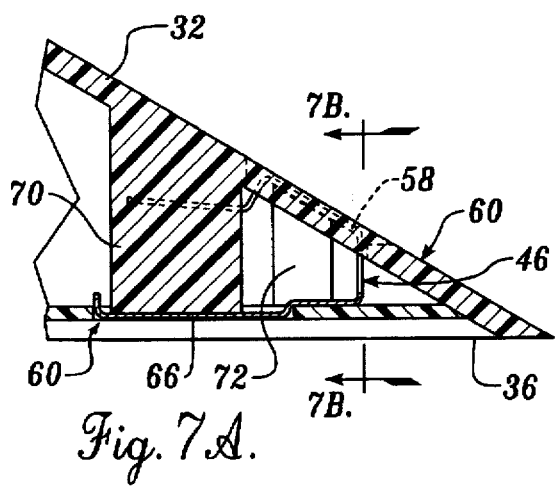
FIG. 7A illustrates a cross-sectional view of part of the battery pack along section line 7A—7A shown in FIG. 7.

The lower portion 26 of the case 22 includes corresponding lower apertures 68. FIG. 7A illustrates an enlarged view of the forward end of the case 22. The lower apertures 68 are formed in the forward end 36 of the lower portion 26. The lower apertures 68 generally correspond in quantity, spacing, and shape to the upper apertures 60. (As will be explained in more detail later, the exterior side of one of the lower apertures 68 is sealed).

Figure 2:
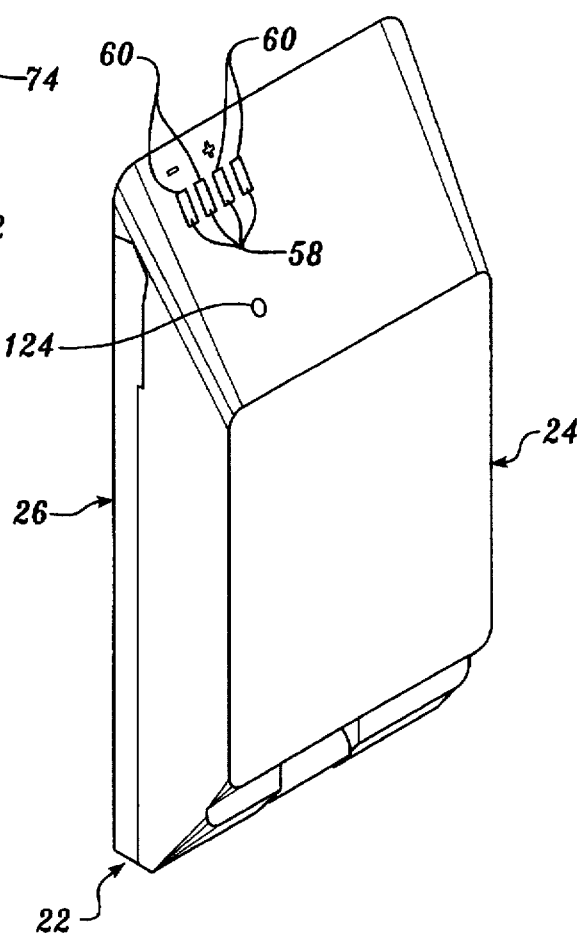
FIG. 2 illustrates a perspective view of the rechargeable battery pack of FIG. 1 from the opposite side of the pack.
Figure 7B:
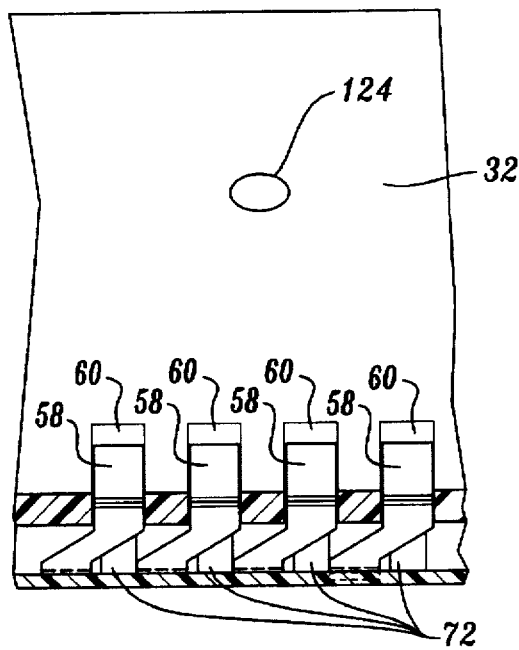
FIG. 7B illustrates a cross-section view of part of the battery pack along section line 7B—7B shown in FIG. 7A.

When the upper portion 24 of the case 22 mates to the lower portion 26, the upper and lower apertures 60 and 68 are offset from one another. Viewing the case 22 from the forward end as illustrated in FIGS. 3 and 4, a lower aperture 68 is located to the right of each upper aperture 60. As shown in FIGS. 7A and 7B, the electrical terminals 46 mount in the case 22 by seating the upper contact segment 58 of each electrical terminal in an upper aperture 60, and seating the lower contact segment 66 in an adjacent lower aperture 68. Thus, the contact segments 58 and 66 of the electrical terminals 46 are exposed to the environment through the upper and lower apertures 60 and 68 as shown in FIGS. 1 and 2.

As illustrated in FIGS. 3 and 4, a plurality of columns 70 extend from the forward wall 32 of the upper portion 24 of the case 22. A column 70 extends from a location proximate each upper aperture 60 in the interior of the case 22. The columns 70 extend generally orthogonally downward towards the lower portion 26 when the upper and lower portions 24 and 26 mate with one another. Referring to FIG. 7A, when the two case portions 24 and 26 mate, the distal end of each column 70 presses against the lower contact segment 66 of an electrical terminal 46 in a lower aperture 68, and helps to maintain the lower contact segment therein.

Preferably, the columns 70 have a substantially rectangular cross-section to generally correspond in shape to the lower apertures 68. However, the proximal ends of the columns 70 slope so that the columns will extend substantially orthogonally downward towards the base portion 26 when the top and base portions 24 and 26 of the case 22 mate.

Figure 7C:
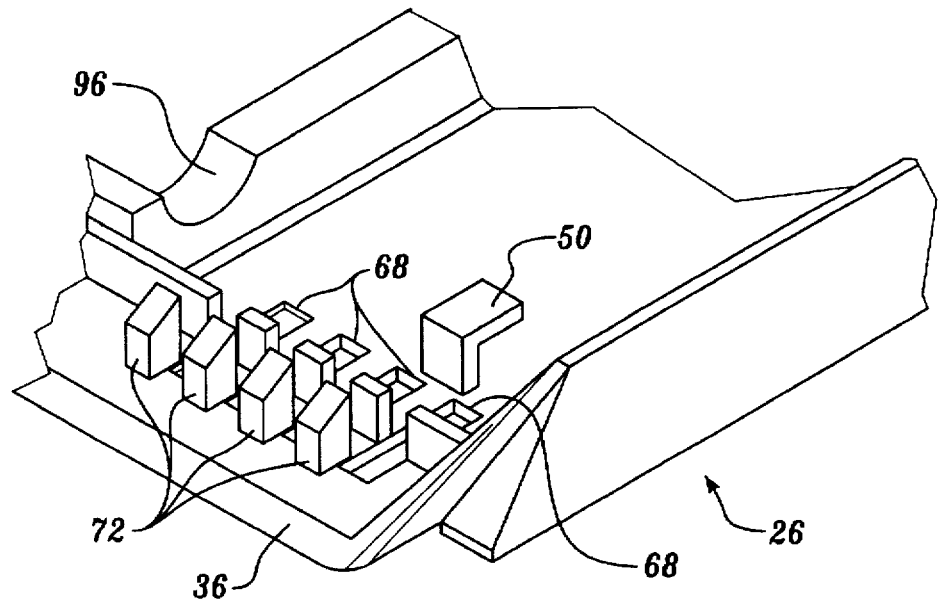
FIG. 7C illustrates an enlarged perspective view of a part of the base portion of the case of the battery pack of FIG. 1.

Conversely, FIGS. 4 and 7C illustrate a plurality of columns 72 extending substantially orthogonally upward from the forward end 36 of the base portion 26. A column 72 extends from a location proximate each lower aperture 68 in the interior of the case 22. When the two case portions 24 and 26 mate, the distal end of each column 72 presses against the upper contact segment 58 of an electrical terminal 46 in an upper aperture 60 as shown in FIG. 7A. This helps to maintain the upper contact segments 58 in the upper apertures 60. Preferably, the columns 72 have substantially rectangular cross sections to correspond in shape to the upper apertures 60. However, the distal ends of the columns 72 slope to account for the slope of the front wall 32 in which the upper apertures 60 are formed.

As will be explained in more detail later, the bottom of the base portion 26 of the case 22 is removably connectable to a mobile telephone. The lower apertures 68 expose the lower contact segments 66 of the electrical terminals 46 to the environment for electrical connection to the mobile telephone. In particular, the lower apertures 68 are for providing electrical power from the batteries in the case 22 to the mobile telephone through the electrical terminals 46. Leads 47 (see FIG. 15) connect to the distal end segments 54 of the electrical terminals 46 and to the circuit board 44 to connect the batteries to the electrical terminals. Preferably, the exterior of one of the lower apertures 68 is sealed because only a positive connection, a negative connection, and a ground are used to provide electrical power from the battery pack 20 to a mobile telephone.

The upper apertures 60 expose the lower contact segments 58 of the electrical terminals 46 to the environment for electrical connection to an external system, such as a telephone recharging stand (not shown). Specifically, when the battery pack 20 connects to a mobile telephone, the assembly can be placed in a telephone recharging stand. Two of the electrical terminals 46 exposed through the upper apertures 60 contact corresponding electrical terminals in the telephone recharging stand for supplying direct current electrical power for recharging the batteries in the case 22.

Two other electrical terminals 46 are also provided. One of these other electrical terminals 46 connects to a thermister for sensing temperature. The other electrical terminal 46 is used to identify the size of the battery pack.

For mechanically connecting the battery pack 20 to a mobile telephone, the bottom of the base portion 26 of the case 22 includes slide tabs 74 as shown in FIG. 1. More particularly, the bottom of the base portion 26 is recessed relative to the side walls of the base portion. A plurality of the slide tabs 74 cantilever from the edges of the longer side walls of the base portion 26, and extend for a short distance across the bottom of the base portion.

When the battery pack 20 connects to a mobile telephone, the slide tabs 74 slide over the ends of the slide plates (not shown) on the telephone for holding the battery pack to the telephone. When the battery pack 20 slidably connects to a mobile telephone, the latch mechanism 40 removably locks the battery pack in place on the telephone.

Figure 12:
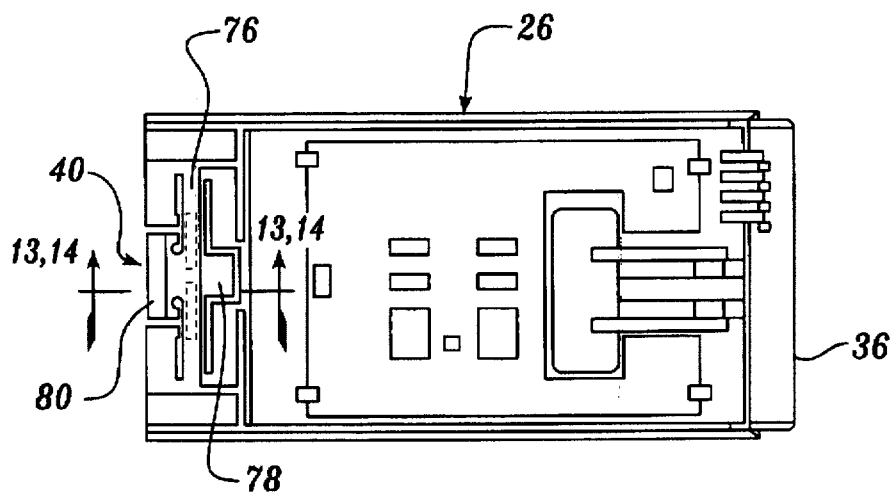
FIG. 12 illustrates a top view of the base portion of the case of the battery pack of FIG. 1.

With reference to FIGS. 1, 3 and 12, the latch mechanism 40 includes a torsion beam 76. The torsion beam 76 mounts in the latch mechanism 40 so that the longitudinal axis of the base portion 26 of the case 22 approximately bisects the longitudinal axis of the torsion beam. One end of the torsion beam 76 mounts to one side of the base portion 26, and the opposite end of the torsion beam 76 mounts to the other side of the base portion.

Figure 13:
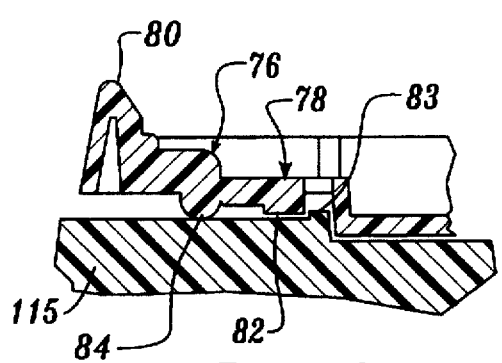
FIGS. 13 and 14 illustrate enlarged, partial cross-sectional views of the lower portion of the battery pack case shown in FIG. 12, along section line 13,14—13,14 shown in FIG. 12.
Figure 14:
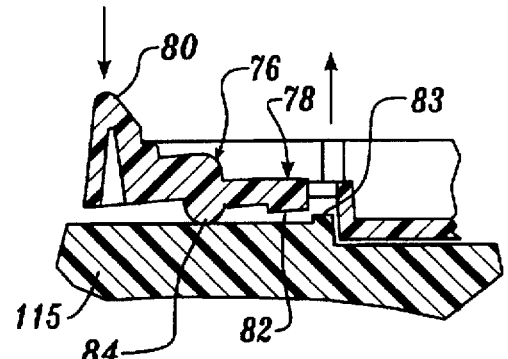

A locking tab 78 centrally extends from the torsion beam 76 towards the forward end 36 of the base portion 26. As shown in FIGS. 1, 13, and 14, the distal edge 82 of the locking tab 78 extends transversely away from the battery pack 20.

The latch mechanism 40 further includes a press tab 80 centrally extending away from the torsion beam 76 in a direction oppositely away from the locking tab 78. The press tab 80 forms a shape corresponding generally to a letter "V". One leg of the V-shape extends diagonally from the torsion beam 76 towards the upper portion 24 of the battery pack 20. The other leg of the V-shape extends diagonally from the first leg in a direction away from the battery pack 20. A notch 42 in the rear end of the upper portion 24 of the case 22 accommodates the press tab 80 when the top and base portions 24 and 26 mate.

Referring to FIG. 13, when the battery pack 20 connects to a mobile telephone 115, the distal edge 82 of the locking tab 78 "snaps" over a rib 83 extending from the telephone in the opposite direction. This, in combination with the slide tabs 74, mechanically connects the battery pack 20 to a mobile telephone.

To disconnect the battery pack 20, the vertex of the V-shaped press tab 80 is pressed. As illustrated in FIG. 14, the pressing forces causes the torsion beam 76 to twist. This twisting pivots the distal edge 82 of the locking tab 78 away from the rib 83 of the telephone 115 so that the battery pack 20 can be slid away from the telephone.

Additionally, a pair of ribs 84 extend centrally for a distance along the length of the bottom of the torsion beam 76. The ribs 84 are aligned along a common axis, with the ends of the ribs spaced from one another. When the press tab 80 is pressed, the ribs 84 press against the telephone 115, and provide an axis for the torsion beam 76 to pivot about. The ribs 84 prevent pressing forces from deflecting the torsion beam 76 against the telephone 115 so that the locking tab 78 can be pivoted away from the telephone.

The recharging system for the battery pack 20 includes an alternating current recharging system, and a direct current recharging system. The alternating current recharging system is for recharging the batteries in the battery pack 20 by connecting the battery pack to a standard household electrical outlet. Household electrical outlets may supply alternating current voltages in the range from 90 to 250 volts, depending upon the geographic area. (Standard household electrical outlets in the United States often supply voltages that are approximately one-half of the voltages supplied by standard household electrical outlets in many foreign countries). In contrast, the direct current recharging system is for recharging the batteries by connecting the battery pack 20 to a low voltage direct current source.

Referring to FIGS. 1, 3 and 4, the alternating current recharging system includes a plug 86. The plug 86 mounts to the base portion 26 of the case 22, and includes a pair of generally parallel, spaced metal prongs 88 for insertion into a standard household electrical outlet. With specific reference to FIG. 4, an axle 90 connects the base of the prongs 88 to one another. The axle 90 is made from a material having a high dielectric constant, such as a polymer or ceramic material, so as to not electrically connect the prongs 88 to one another.

The plug 86 rotatably mounts to the interior of the base portion 26 of the case 22 as follows. The base portion 26 of the case 22 includes a raised section 92 having an outer periphery corresponding generally to an upper case letter "T". The base of the raised T-shaped section 92 extends centrally rearward from the forward end 36 of the base portion 26.

The raised section 92 includes a generally semi-circular channel 96 formed transversely across the base of the T-shape. The semi-circular channel 96 cuts across the base of the T-shape at a location between the distal end and the mid-point of the base. Additionally, the raised section 92 includes a generally rectangular channel 94 extending from the semi-circular channel 96 to the proximal end of the base of the T-shape. The rectangular channel 94 runs centrally along the base of the T-shape and substantially bisects the semi-circular channel 96. Further, the base portion 26 includes a slot 98 running along each side of the base of the raised T-shaped section 92. The slots 98 each extend partially past the base into the upper end of the T-shape.

Figure 8:
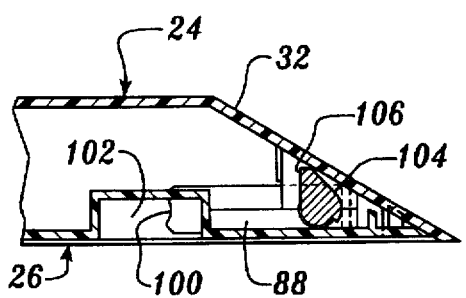
FIGS. 8 and 9 illustrate enlarged, partial cross-sectional views of the battery pack of FIG. 1 along section line 8,9—8,9 shown in FIG. 7.
Figure 9:
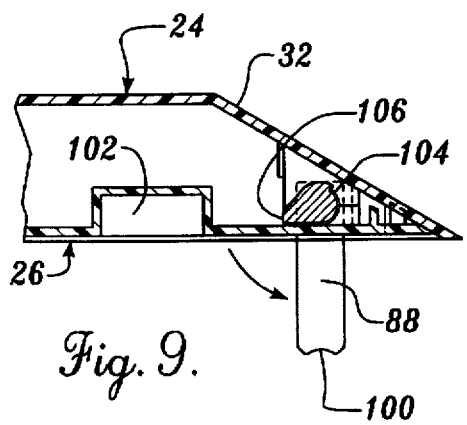

The axle 90 for the plug 86 rotatably rests in the semi-circular channel 96. The prongs 88 extend substantially orthogonally from the axle 90 on either side of the base of the raised T-shaped section 92. Thus, the plug 86 can be rotated from a retracted position shown in FIGS. 3 and 8, to an extended position shown in FIGS. 1 and 9. In the retracted position, the prongs 88 of the plug 86 are retracted into the case 22, and the distal ends of the prongs extend along the slots 98 into the upper end of the raised T-shaped section 92. In the extended position, the prongs 88 extend substantially orthogonally from the case 22 for insertion into an electrical outlet.

The distal ends of the prongs 88 each include a notch 100 to facilitate rotating the plug from the retracted position to the extended position, and vice versa. Further, in the retracted position, the distal ends of the prongs 88 extend into a rectangular recess 102 defined on the bottom of the case 22. The rectangular recess 102 provides space for accessing the distal ends of the prongs 88 with a finger tip when the plug 86 is retracted.

As shown in FIG. 4, a stop 104 centrally mounts to the axle 90 of the plug 86 for limiting the plug's rotation. The stop 104 is in the form of a collar coaxially surrounding the axle 90, and having an end 106 projecting transversely away from the axle. When the axle 90 of the plug 86 mounts in the semi-circular channel 96 in the raised T-shaped section 92, the stop 104 projects into the rectangular channel 94 of the raised T-shaped section. When the plug 86 rotates from the retracted position shown in FIG. 8, to the extended position shown in FIG. 9, the end 106 of the stop 104 impacts the bottom of the rectangular channel 94 when the plug fully extends, thus limiting plug rotation in that direction. Similarly, when the plug 86 rotates from the extended position to the retracted position, the end 106 of the stop 104 impacts the forward wall 32 of the upper portion 24 when the plug fully extends, thus limiting plug rotation in that direction.

With reference to FIGS. 3 and 4, a pair of spaced, generally parallel tabs 105 extend downward from the interior of the forward wall 32 of the top portion 24 of the case 22. Each tab includes a downward facing semi-circular notch 107. When the two portions 24 and 26 of the case 22 mate, the semi-circular notches 107 tabs 105 surround the upper portion of the axle 90 of the plug 86. This rotatably retains the axle 90 in the semi-circular channel 96 in the base portion 24 of the case 22.

A plurality of brushes 108 and electrical contacts 110 and 112 electrically connect the plug 86 to the circuit board 44. More particularly, the T-shaped cut-out 48 in the circuit board 44 surrounds the raised T-shape section 92 in the case 22. A pair of generally serpentine-shaped electrical brushes 108 mount to the forward end of the circuit board 44, proximate the T-shaped notch 48. Specifically, the brushes 108 mourn across from one another on opposite sides of the base of the T-shaped notch.

Figure 10:
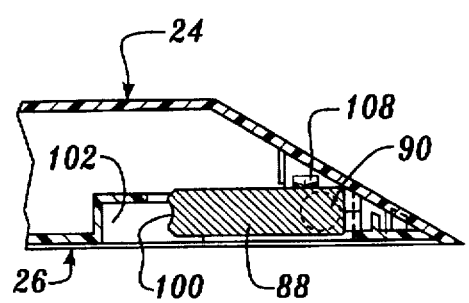
FIGS. 10 and 11 illustrate enlarged, partial cross-sectional views of the battery pack of FIG. 1 along section line 10,11—10,11 shown in FIG. 7.
Figure 11:
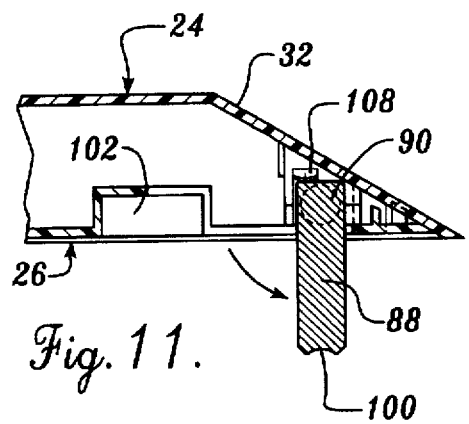

The tail of the serpentine-shape of each brush 108 mounts to the circuit board 44, and electrically connects thereto. The head of the serpentine shape of each brush 108 extends over the T-shaped notch 48, and presses downwardly against a prong 88. In particular, the brushes 108 are resilient, and are biased to press against the base of the prongs 88. As the plug 86 rotates, the brushes 108 press against the base of the prongs 88, and remain in contact therewith as shown in FIGS. 10 and 11. This contact between the brushes 108 and the prongs 88 electrically connects the prongs to the circuit board 44.

The brushes 108 electrically connect the prongs 88 to a recharging circuit 122, as schematically illustrated in FIG. 15. More particularly, when the prongs 88 extend, a high voltage alternating current source 120 may supply electrical power to the battery pack 20. That is, the prongs 88 may be inserted into a standard, household electrical socket. A conventional recharging circuit 122 disposed upon the circuit board 44 transforms the high voltage alternating current to a low voltage direct current suitable for recharging the batteries 118.

The alternating recharging system for the battery pack 20 additionally includes a light emitting diode 124. The diode 124 is disposed in series between the recharging circuit 122 and the batteries 118. Thus, the diode 124 illuminates when the alternating current recharging system is operating for visually indicating battery pack 20 has been electrically connected to an alternating current source through the plug 86. The diode 124 is visible through an aperture formed in the case 22 as shown in FIGS. 2 through 4, and 7.

Referring to FIGS. 10 and 11, the brushes 108 aid in retaining the plug 86 in the extended position. Specifically, the brushes 108 press against the base of the prongs 88 at a location offset from the central axis of the axle 90 of the plug 86. The direction of offset is towards the distal ends of the prongs 88. When the prongs 88 are extended, the pressing force of the brushes 108 in combination with the offset creates a torque that acts to retain the plug 86 in the extended position.

As shown in FIGS. 3 and 4, a plurality of electrical contacts also mount across from one another on opposite sides of the base of the T-shaped notch 48 of the circuit board 44. In particular, a first pair of electrical contacts 110 mount adjacent the proximal end of the base of the T-shaped notch 48. A second pair of electrical contacts 112 mount at a location approximately midway to the distal end of the T-shaped notch 48. Thus, an electrical contact 110 of the first pair is spaced from an electrical contact 112 of the second pair on each side of the base of the T-shaped notch 48.

The electrical contacts 110 and 112 are each generally in the shape of a letter "V." One leg of the V-shape mounts to the circuit board 44. The vertex of the V-shape points towards the longitudinal axis of the T-shaped notch 48, and extends slightly into the notch. As shown in FIG. 3, when the prongs are retracted into the case 22, the vertex of the V-shape of the electrical contacts 110 and 112 contacts the sides of the prongs.

Additionally, the outward facing sides of the prongs 88 each include a groove 114. The grooves 114 are formed centrally along the length of each prong 88, and removably receive the vertex of the V-shape of the electrical contacts 110 and 112 when the prongs retract. This helps to retain the prongs 88 in the retracted position.

When the prongs 88 retract, each prong contacts an electrical contact 110 and 112. Thus, the electrical contacts 110 and 112 electrically connect to one another through a prong 88. However, when the prongs 88 extend, the electrical connection between the contacts 110 and 112 through a prong is broken. In particular, the prong 88 is removed from each of the electrical contacts 110 and 112, breaking the electrical connection between the spaced contacts. Thus, each prong 88 acts as a switch to connect and disconnect the electrical contacts 110 and 112 to one another. The purpose of this is as follows.

Referring to FIG. 15, when the battery pack 20 connects to a mobile telephone 115 and is placed in a telephone recharging stand, a source 116 of low voltage direct current electrical power connects to the battery pack. In particular, the direct voltage source 116 supplies electrical power to the battery pack 20 through two of the electrical terminals 46 at the forward end of the battery pack.

This direct current is supplied to the terminals of the batteries 118 in the battery pack 20 through leads 47. When the prongs 88 retract, direct current from the lower voltage source 116 may flow from the electrical terminals 46 through the prongs to the batteries 118 for recharging. When the prongs 88 extend, there is no electrical connection to the electrical terminals 46 through the prongs because a pair of spaced electrical contacts 110 and 112 interrupt each electrical leads 47.

The effect of electrically connecting each pair of spaced electrical contacts 110 and 112 to one another through a prong 88 is to decouple the alternating current recharging system from the direct current recharging system. This decoupling arrangement ensures that a high voltage alternating current will not be supplied to the electric terminals 46 at the forward end of the battery pack 20 to minimize electrical shock hazard.

While the preferred embodiment of the invention has been illustrated and described, it will be appreciated that various changes can be made therein without departing from the spirit and scope of the invention. For example, the battery pack 20 could be modified to have the plug 86 connected to the top portion 24, rather than the base portion 26 of the case 22. The advantage of this is that the battery pack 20 could remain connected to a mobile telephone, while the prongs 88 are inserted into an electrical outlet for recharging the battery pack. In comparison, in the preferred embodiment, the battery pack 20 must be disconnected from a mobile telephone before the prongs 88 can be accessed. In view of these and other alterations, substitutions and modifications that could be made by one of ordinary skill in the art, it is intended that the scope of letters patent granted hereon be limited only by the definitions of the appended claims.

The embodiments of the invention in which an exclusive property or privilege is claimed are defined as follows:

1. A battery pack for holding at least one battery and for connecting to a mobile telephone for supplying electrical power thereto, the battery including first and second battery terminals, the battery pack comprising:
   (a) a case for holding the battery;
   (b) a recharging circuit disposed in said case; and
   (c) a plug including first and second prongs spaced from one another, and generally parallel to each other, said plug being rotatably connected to said case, wherein said plug is rotatable from a first position having said prongs retracted in the case, to a second position with said prongs projecting from said case, said prongs being electrically connected to said recharging circuit, said first and second prongs each include a distal end, said distal end of each said prong including a notch to facilitate applying a pulling force to said distal ends of said prongs, causing said plug to rotate from said first position to said second position.

2. A battery pack for holding at least one battery and for connecting to a mobile telephone for supplying electrical power thereto, the battery pack comprising:
   (a) a case having a top portion and a base portion;
   (b) a plurality of elongate, first apertures formed in said base portion of said case, said plurality of said first apertures each having a longitudinal axis, each spaced from one another and aligned with one another along a line substantially orthogonal to the longitudinal axis of each said first aperture;
   (c) a plurality of elongate, second apertures formed in said top portion of said case, said plurality of said second apertures each having a longitudinal axis, each spaced from one another and aligned with one another along a line substantially orthogonal to the longitudinal axis of each said second aperture, said second apertures being located in said top portion of said case at positions offset from the positions of said first apertures in said base portion of said case;
   (d) a plurality of first electrical terminals, each said first electrical terminal having a first end and a second end, said first end of each said first electrical terminal being located in one of said first apertures, and said second end of each said first electrical terminal being located in one of said second apertures;
   (e) a plurality of first columns each having a distal end and a proximal end connected to said base portion of said case, the distal end of each said first column extending to one of said second apertures in said top portion of said case and holding said first end of one of said first electrical terminal therein; and
   (f) a plurality of second columns each having a distal end and a proximal end connected to said top portion of said case, said distal end of each said second column extending to a said first aperture in said base portion of said case and holding said second end of one of said first electrical terminal therein.

3. The battery pack of claim 2, further comprising:
   (g) a plug including first and second prongs spaced from one another, and generally parallel to each other, said plug being rotatably connected to said case, wherein said plug is rotatable from a first position having said prongs retracted in said case, to a second position with said prongs projecting from said case; and
   (h) a recharging circuit in said case having a first end electrically connected to each of said prongs, and having a second end for electrically connecting to the battery.

4. A battery pack for holding a battery and for connecting to a mobile telephone having a first rib, the battery pack comprising:
   (a) a case for holding the battery; and
   (b) a latch mechanism for removable connection to the mobile telephone, said latch mechanism including:
      (i) a torsion beam having opposite first and second ends connected to said case, said torsion beam having length between the opposite first and second ends;
      (ii) a first tab extending in a direction transversely away from said torsion beam, and having a distal end which extends away from said case for engaging the rib of the mobile telephone;
      (iii) a second rib projecting from said torsion beam in a direction away from said case, said second rib extending for a distance along the length of said torsion beam; and
      (iv) a second tab extending away from said torsion beam in a direction substantially opposite to the direction said first tab extends, when said latch mechanism is placed against the mobile telephone and said second tab is pressed away from said case, said torsion beam resiliently twists and rotates about said second rib and said first tab rotates in a direction towards said case disengaging said distal end of said first tab from the first rib of the mobile telephone.

5. The battery pack of claim 4, further comprising:
   (c) a plug including first and second prongs spaced from one another, and generally parallel to each other, said plug being rotatably connected to said case, wherein said plug is rotatable from a first position having said prongs retracted in said case, to a second position with said prongs projecting from said case; and
   (d) a recharging circuit in said case having a first end electrically connected to each of said prongs, and having a second end for electrically connecting to the battery.

6. The battery pack of claim 5, wherein the battery includes first and second battery terminals, the battery pack further comprising:

(e) a first electrical terminal mounted to said case; and (f) a first electrical lead extending from said first electrical terminal to one of the terminals of the battery, the first electrical lead being interrupted by a first pair of spaced contacts, when said plug is in said first position having said prongs retracted, one of said prongs electrically connects said first pair of spaced contacts to one another, and when said plug is in said second position with said prongs projecting from said case, one of said prongs electrically disconnects said first pair of spaced contacts from one another.

7. The battery pack of claim 6, further comprising:

(g) a second electrical terminal disposed in said case; and (h) a second electrical lead extending from said second electrical terminal to the other terminal of the battery, the second electrical lead being interrupted by a second pair of spaced contacts, the other of said prongs electrically connecting said second pair of spaced contacts to one another when said plug is in said first position having said prongs retracted, and said other of said prongs electrically disconnecting said second pair of spaced contacts from one another when said plug is in said second position with said prongs projecting from said case.

8. The battery pack of claim 4, wherein said case includes a top portion and a base portion, further comprising:

(c) a plurality of elongate, first apertures formed in the base portion of said case, said plurality of said first apertures each having a longitudinal axis, and being spaced from one another, and aligned with one another along a line substantially orthogonal to the longitudinal axis of each said first aperture;

(d) a plurality of elongate, second apertures formed in said top portion of said case, said plurality of said second apertures each having a longitudinal axis, each being spaced from one another and aligned with one another along a line substantially orthogonal to the longitudinal axis of each said second aperture, said second apertures being located in said top portion of said case at portions offset from the positions of said first apertures in said base portion of said case;

(e) a plurality of electrical terminals, each said electrical terminal having a first end and a second end, said first end of each said electrical terminal being located in one of said first apertures, and said second end of each electrical terminal being located in one of said second apertures;

(f) a plurality of first columns each having a distal end and a proximal end connected to said base portion of said case, said distal end of each said first column extend to one of said second apertures in said top portion of said case and holding said first end of one of said electrical contacts therein; and (g) a plurality of second columns each having a distal end and a proximal end connected to said top portion of said case, said distal end of each said second column extending to a said first aperture in said base portion of said case and holding said second end of one of said electrical terminals therein.

9. A battery pack for holding at least one battery and for connecting to a mobile telephone for supplying electrical power thereto, the battery pack comprising:

(a) a case for holding the battery;

(b) a recharging circuit disposed in said case;

(c) a plug including first and second prongs spaced from one another, and generally parallel to each other, said plug being rotatably connected to said case, wherein said plug is rotatable from a first position having said prongs retracted in the case, to a second position with said prongs projecting from said case, said prongs being electrically connected to said recharging circuit, said prongs having length, one of said prongs including a groove formed along the length; and (d) a contact mounted to said case, said contact having an end which is received in said groove of said one of said prongs when said plug is in said first position for releasably retaining said plug in said first position.

10. A battery pack for holding at least one battery and for connecting to a mobile telephone for supplying electrical power thereto, the battery pack comprising:

(a) a case for holding the battery;

(b) a recharging circuit disposed in said case;

(c) a plug including first and second prongs spaced from one another, and generally parallel to each other, said plug being rotatably connected to said case, wherein said plug is rotatable from a first position having said prongs retracted in the case, to a second position with said prongs projecting from said case, said prongs being electrically connected to said recharging circuit, one of said prongs including a longitudinal axis and a base, said one of said prongs rotating with the plug about an axis of rotation passing through said base of said one of said prongs and intersecting the longitudinal axis of said one of said prongs; and (d) an electrical brush connected to said recharging circuit, said electrical brush biased to press against said base of said one of said prongs for electrically connecting to said one of said prongs, said electrical brush pressing against said base of said one of said prongs at a location removed from the longitudinal axis of said one of said prongs, generally in the direction of rotation of said plug when said plug rotates from said first position to said second position to aid in maintaining said plug in said second position.

\* \* \* \* \*